US009846690B2

(12) United States Patent
Marston

(10) Patent No.: US 9,846,690 B2
(45) Date of Patent: Dec. 19, 2017

(54) AUTOMATING INTERROGATIVE POPULATION OF ELECTRONIC FORMS USING A REAL-TIME COMMUNICATION PLATFORM

(75) Inventor: Cayce B. Marston, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 709 days.

(21) Appl. No.: 12/395,956

(22) Filed: Mar. 2, 2009

(65) Prior Publication Data

US 2010/0223543 A1    Sep. 2, 2010

(51) Int. Cl.
| | | |
|---|---|---|
| G06F 15/16 | (2006.01) | |
| G06F 17/21 | (2006.01) | |
| G06F 17/24 | (2006.01) | |
| G06K 9/00 | (2006.01) | |
| H04L 12/58 | (2006.01) | |
| G06F 17/27 | (2006.01) | |

(52) U.S. Cl.
CPC ....... *G06F 17/243* (2013.01); *G06K 9/00409* (2013.01); *G06K 9/00449* (2013.01); *H04L 51/04* (2013.01); *G06F 17/2725* (2013.01)

(58) Field of Classification Search
CPC .............. G06F 17/243; G06F 17/2725; G06K 9/00409; G06K 2209/01; G06K 9/00449; H04L 51/04
USPC .......................................................... 709/206
See application file for complete search history.

(56) References Cited

U.S. PATENT DOCUMENTS

| | | | |
|---|---|---|---|
| 6,704,906 B1 | 3/2004 | Yankovich et al. | |
| 7,000,179 B2 | 2/2006 | Yankovich et al. | |
| 2004/0003341 A1 | 1/2004 | alSafadi et al. | |
| 2004/0080529 A1 | 4/2004 | Wojcik | |
| 2004/0205533 A1* | 10/2004 | Lopata ................. | G06F 17/243 715/226 |
| 2006/0106610 A1* | 5/2006 | Napper ................. | G06F 17/243 704/270 |
| 2006/0161646 A1* | 7/2006 | Chene ................... | G06F 17/243 709/223 |
| 2006/0190810 A1* | 8/2006 | Piersol ........................ | 715/506 |

(Continued)

OTHER PUBLICATIONS

Boyer, John M., W3C XForms 1.1, Oct. 20, 2009, W3C (MIT, ERCIM, Keio), Available online at: www.w3.org/TR/xforms/#intro- diffs-model-instance (see abstract) or www.w3.org/TR/2007/CR-xforms11-20071129/ (see same abstract with earlier date Nov. 29, 2007).*

(Continued)

*Primary Examiner* — David Lazaro
*Assistant Examiner* — Xiang Yu
(74) *Attorney, Agent, or Firm* — Cuenot, Forsythe & Kim, LLC

(57) ABSTRACT

A computer-implemented method of obtaining form data can include selecting a control from within an electronic form, determining a textual representation of the control, and sending the textual representation of the control as part of a message to a client messaging system through a real-time communication system. A response message from the client messaging system can be received through the real-time communication system. Form data specified by the response message can be stored within memory when the form data is valid, as specified according to the electronic form.

17 Claims, 6 Drawing Sheets

(56) References Cited

U.S. PATENT DOCUMENTS

| | | |
|---|---|---|
| 2007/0033595 A1 | 2/2007 | Carr et al. |
| 2007/0130504 A1 | 6/2007 | Betancourt et al. |
| 2007/0288854 A1 | 12/2007 | Koskimies |
| 2008/0010586 A1 | 1/2008 | Betancourt et al. |
| 2010/0153441 A1* | 6/2010 | Lopata et al. ............ 707/769 |

OTHER PUBLICATIONS

Cardone et al., "Using XForms to Simplify Web Programming", IBM Watson Research Center, WWW 2005, May 10-14, 2005, Chiba, Japan, ACM 1-59593-046-9/05/0005.

Marston, "Extending Service-Oriented Architectures with XForms", IBM Software Group, Workplace Portal and Collaboration, Nov. 2005.

* cited by examiner

300

| 305 — | FormAgent: | ►You have been requested to fill out a form by John Doe. Accept [Y/N]? | 6:33:12 PM |
| --- | --- | --- | --- |
| 310 — | JoeSmith: | ►Y | 6:33:20 PM |
| 315 — | FormAgent | ►Thanks. In order to proceed, please respond to the following questions. If data is invalid, you will be prompted to re-enter your response.<br>Enter "First Name": | 6:34:32 PM<br><br>6:34:55 PM |
| 320 — | JoeSmith | ►Joe | 6:35:30 PM |
| 325 — | FormAgent | ►Enter "Last Name": | 6:36:02 PM |
| 330 — | JoeSmith | ►Smith | 6:37:04 PM |

| 325 — | FormAgent: | ►Enter "Last Name": | 6:36:02 PM |
| --- | --- | --- | --- |
| 330 — | JoeSmith: | ►Smith | 6:37:04 PM |
| 335 — | FormAgent | ►Enter "Your Social Security Number", must be of format "###-##-#### or #########": | 6:39:01 PM |
| 340 — | JoeSmith | ►123-45-6789 | 6:39:54 PM |

505 — Name _____ ___ _____
(First) (Middle Initial) (Last)

Birth place _____

Citizenship  [Select one ▽]

Marital Status  ☐ Married   ☐ Single
              ☐ Divorced  ☐ Widowed

510 — FormAgent: ▶ Thanks. In order to proceed, please respond to the following questions. If data is invalid, you will be prompted to re-enter your response.     6:33:12 PM 515 — ▶ The above image of the form page has been provided for reference purposes.

520 — ▶ Enter "First Name":

605 — FormAgent: ▶ Thanks. In order to proceed, please respond to the following questions. If data is invalid, you will be prompted to re-enter your response.     6:33:12 PM 610 — Name _____ ___ _____
(First) (Middle Initial) (Last)

615 — ▶ The above image of the form page has been provided for reference purposes.

620 — ▶ Enter "First Name":

FIG. 6

AUTOMATING INTERROGATIVE POPULATION OF ELECTRONIC FORMS USING A REAL-TIME COMMUNICATION PLATFORM

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments of the present invention relate to electronic forms. Electronic forms attempt to provide a reusable model through which users can be asked information and provide responses. Some electronic forms have intelligence built into the form as opposed to their static, paper-based counterparts.

XForms, the World Wide Web Consortium (W3C) standard for electronic forms, defines an Extensible Markup Language (XML) format for the abstract specification of forms for the Web. An XForms model includes a definition of an abstract user interface, one or more data models and in-form validation and business logic. XForms models are intended to be hosted within a presentation language such as, for example, HyperText Markup Language (HTML) or Extensible HyperText Markup Language (XHTML), Extensible Forms Description Language (XFDL), or Wireless Markup Language (WML). Depending upon the host language, implementations of the XForms model may be rendered on, and accessed using a range of systems including, but not limited to, personal computers, laptops, and pervasive devices such as personal digital assistants or mobile phones. Form controls are typically organized into pages and visually presented to end users.

An XForms-based electronic form document may include more advanced features, such as validating received data against XML schema data types, requiring certain data in certain user interface form fields, disabling input controls, changing sections of the form depending on circumstances, and responding to actions in real time rather than at submission time. Thus, XForms functionality may reduce or even eliminate the need for the application to provide user interface handler scripts for managing the user interface appropriately for an application. Further information about XForms can be found within the XForms Specification entitled "XForms 1.0 Third Edition," as published by The World Wide Web Consortium (W3C).

Typically, a user is notified via electronic mail, or some other means, that an XForm is available for that user to complete. The user retrieves the XForm from a server, or other location, and loads the XForm. XForms functionality is usually implemented as an XForms processor installed on the user's computer, e.g., within a client computer. For example, an XForms plug-in executable may be installed to execute within a Web browser on the user's computer.

BRIEF SUMMARY OF THE INVENTION

The embodiments disclosed herein relate electronic forms. One embodiment of the present invention can include a computer-implemented method of obtaining form data. The computer-implemented method can include selecting a control from within an electronic form, determining a textual representation of the control, and sending the textual representation of the control as part of a message to a client messaging system through a real-time communication system. A response message from the client messaging system can be received through the real-time communication system. Form data specified by the response message can be stored as form instance data within memory when the form data is valid, as determined according to the electronic form.

Another embodiment of the present invention can include a system for obtaining form data. The system can include a processor executing computer-usable program code that selects a control from within an electronic form, determines a textual representation of the control, and sends the textual representation of the control as part of a message to a client messaging system through a real-time communication system. The processor further can receive a response message from the client messaging system through the real-time communication system and store form data specified by the response message as form instance data within memory when the form data is valid, as determined according to the electronic form.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 3 is a view of a graphical user interface (GUI) displayed by a client messaging system in accordance with another embodiment of the present invention.

FIG. 4 is a view of a GUI displayed by a client messaging system illustrating another embodiment of the present invention.

FIG. 5 is a view of a GUI displayed by a client messaging system in accordance with another embodiment of the present invention.

FIG. 6 is a view of a GUI displayed by a client messaging system in accordance with another embodiment of the present invention.

DETAILED DESCRIPTION OF THE INVENTION

Figure 1:
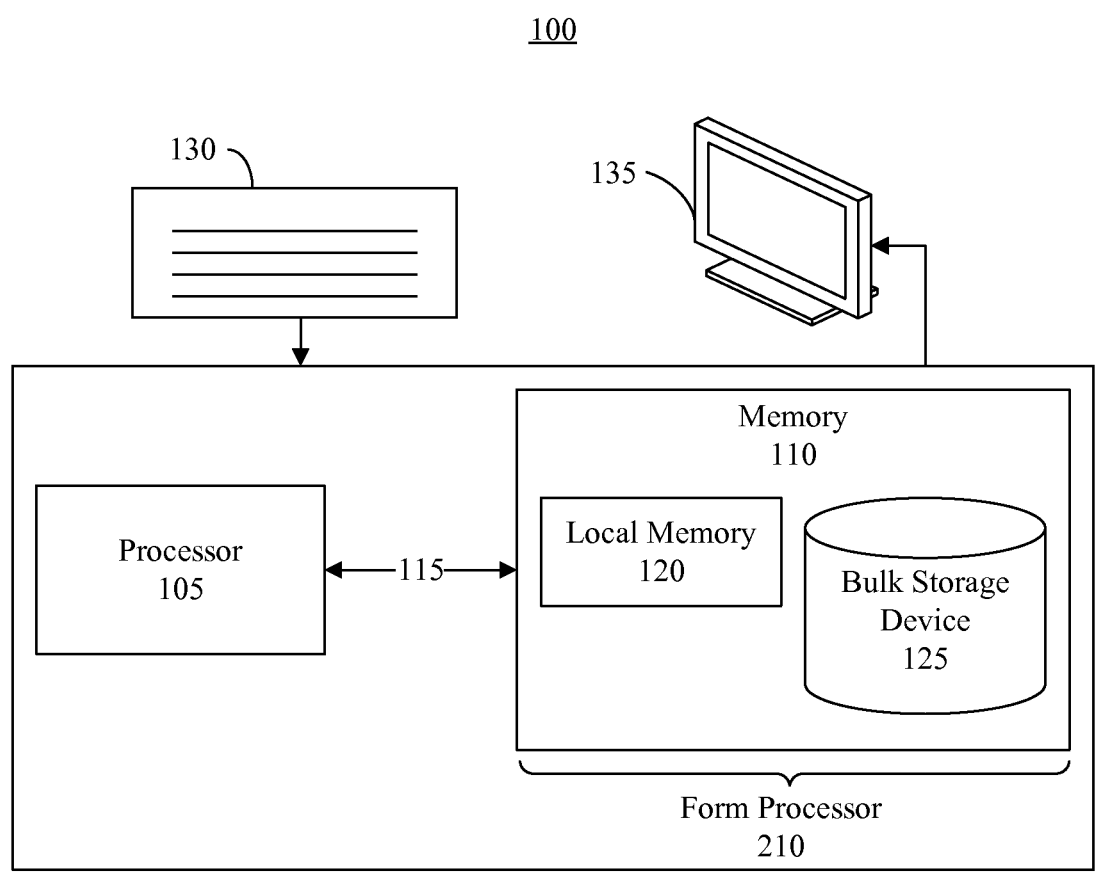
FIG. 1 is a block diagram illustrating a computer system suitable for storing and/or executing program code in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit,"

"module" or "system." Furthermore, an embodiment of the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to processing electronic forms in a real-time computing environment. More particularly, the inventive arrangements allow portions of electronic forms to be sent to users via a real-time communication system. Portions of the electronic form can be converted into textual representations that can be sent to client messaging systems in the form of real-time messages. Responses from the client messaging system can be received in the form of real-time messages. Data included within the real-time message responses can be extracted and stored in answer to various portions of the electronic form.

The embodiments disclosed herein provide a variety of benefits which will be described in further detail with reference to the accompanying drawings. In one aspect, for example, electronic forms, or portions thereof, may be pushed to users in real-time. Responses from users in answer to individual data fields of the electronic form also may be captured in real-time. Additionally, the use of a real-time communication system alleviates the need for client systems to execute specialized, client-side software for processing electronic forms.

FIG. 1 is a block diagram illustrating a system 100 for real-time processing of electronic forms in accordance with one embodiment of the present invention. System 100 can be implemented in the form of a data processing system, e.g., a computer, that is suitable for storing and/or executing program code. Accordingly, system 100 can include at least one processor 105 coupled directly or indirectly to memory elements denoted as memory 110 through a system bus 115. Memory 110 can include one or more physical memory devices or elements. The elements can include, for example, local memory 120 employed during actual execution of the program code, e.g., random access memory (RAM), one or more bulk storage devices 125, e.g., a hard drive or other persistent data storage device, and cache memories (not shown) which provide temporary storage of at least some program code in order to reduce the number of times code must be retrieved from bulk storage during execution.

Optionally, input/output (I/O) devices such as a keyboard 130, a display 135, and a pointing device (not shown) optionally can be coupled to system 100 as well as one or more other I/O devices. The I/O devices can be coupled to system 100 either directly or through intervening I/O controllers. Network adapters also can be coupled to system 100 to enable system 100 to become coupled to other data processing systems or remote printers or storage devices through intervening private or public networks. Modems, cable modems, and Ethernet cards are just a few of the currently available types of network adapters.

In one embodiment, system 100 be implemented as a server executing form processor 210. Form processor 210 can be implemented as server-side, real-time form processing software. As shown, form processor 210 can be stored in memory 110 and executed by processor 105. By executing form processor 210, processor 105, and thus system 100, can implement the various functions described within this specification.

Figure 2:
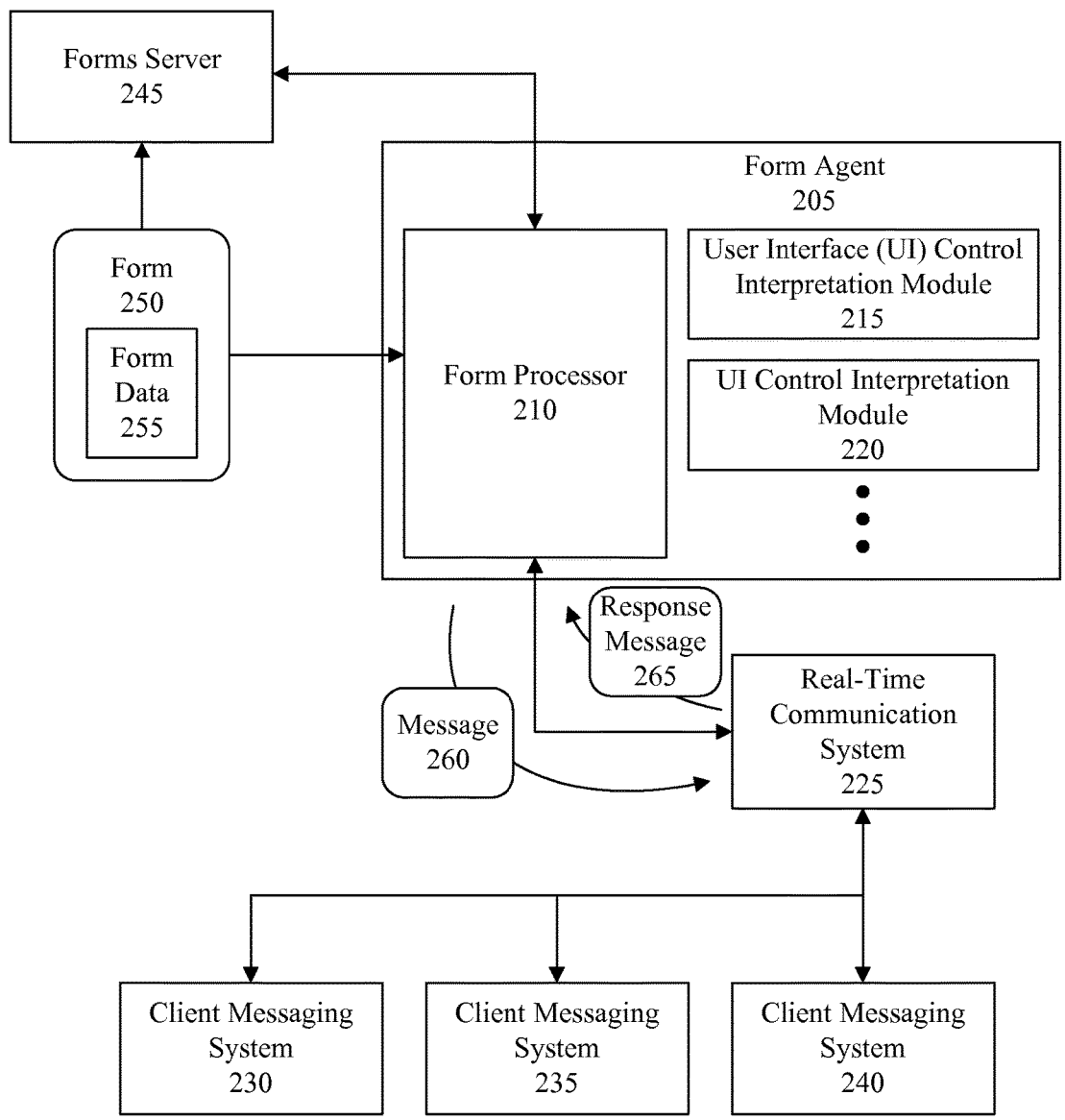
FIG. 2 is a block diagram illustrating a system for real-time collection of form data in accordance with another embodiment of the present invention.

FIG. 2 is a block diagram illustrating a system 200 for real-time collection of form instance data in accordance with another embodiment of the present invention. As shown, system 200 can include a form agent 205 and a real-time communication system (RTCS) 225. RTCS 225 can be in communication with one or more client messaging systems such as client messaging systems 230, 235, and 240. System 200 can also include an optional forms server 245.

Form agent 205, RTCS 225, and forms server 245, each can be implemented as a data processing system, e.g., a server, executing suitable server-side computer-usable program code. Form agent 205, for example, can be implemented as system 100 described with reference to FIG. 1. While FIG. 2 illustrates each of form agent 205, RTCS 225, and form server 245 as a separate and independent data processing system, it should be appreciated that one or more of the data processing systems described, and/or the functions of such systems, may be combined into a single, larger, or more powerful, data processing system. By the same token, such functions may be segmented wherein one or more of the data processing systems illustrated is implemented as a plurality of data processing systems.

Form agent 205 can process electronic forms, such as form 250, in a manner that supports real-time interaction with users through instant messaging to collect and populate form data 255 within form 250. As will be described in greater detail, form agent 205 can leverage the capabilities of the RTCS 225, to push a form, or portions of a form, to one or more different users in order to obtain user responses. The user responses to various portions of the form can be sent back to the form agent 205 through RTCS 225.

An "electronic form," or "form," as used within this specification, can refer to any of a variety of different compound document formats that may include two or more formats, e.g., specification languages. Typically, within a compound document, and thus a form, the manner in which the data is specified is independent of the manner in which the data is visually presented.

A form, such as form 250, will include a form model that defines aspects of the data such as each individual data item to be collected. In general, the form model is formed of a plurality of controls, wherein each control corresponds to a data item to be collected from a user. Each control can specify data type information about the data item. Data type information can specify, for example, the type of the data item to be collected, e.g., numeric, string, etc., whether the data item to be collected for the control is an input or an output, or the like. The XForm model further can specify the order of the data instances (and therefore data items), as well as the order of the abstract user interface controls. In this regard, the XForm model specifies a flow-based layout of the form. The form model, however, does not specify "pages" in that the concept of a page does not exist with regard to the form model.

The form model will be "wrapped" by a host language that specifies how the form model will be visualized. The host language, in some cases, can also be referred to as the "presentation language" or "presentation layer." The host language provides the layout information for the form. The host language specifies aspects of visualization such the definition of what constitutes a form page, where each control will be placed on a page, how many controls will be on a particular page, the particular visual objects or graphical user interface (GUI) objects used to collect data, e.g., whether radio buttons, drop-down lists, or text fields are used, etc. Typically, it is the host language that is interpreted by the client system to render or visualize the form. The separation between presentation, data, and input controls allows different host languages to be used while maintaining the same underlying validation and business logic.

For example, the XForms Model can define the data structure and bindings describing business logic within the XForm. Examples of the host languages that can be used to host an XForm Model can include, but are not limited to, Wireless Markup Language (WML), Extensible Forms Description Language (XFDL), Extensible HyperText Markup Language (XHTML), or the like. As noted, the embodiments described herein can be used with any of a variety of compound documents. While XForms is used, from time-to-time within this specification, such use is for purposes of illustration only and is not intended as a limitation of the arrangements disclosed. Other examples of compound documents can include, but are not limited to, Portable Document Format documents, OpenDocument format, and the like.

Turning again to FIG. 1, form agent 205 can include a form processor 210. Form agent 205 also can include one or more optional user interface (UI) control interpretation modules 215 and 220. In general, form processor 210 can perform a variety of different functions including, but not limited to, extracting a form model, e.g., XForm Model, from a form, such as form 250, selecting and invoking an appropriate UI control implementation module from those available and when applicable, outputting messages to RTCS 225, receiving messages from RTCS 225, and the like. As used herein, "output" or "outputting" can include, but is not limited to, storing data in memory, e.g., writing to a file, writing to a user display or other output device, e.g., playing audible notifications, sending or transmitting to another system, exporting, or the like.

Form processor 210 can perform additional functions such as validation of received form data corresponding to a control, querying for further form data when the received form data is not valid, storing form data 255 within form 250 within memory, and determining whether form data 255 is complete for a given form, e.g., form 250. Form processor 210 also can distribute or store complete form data according to any of a variety of different storage and/or distribution techniques.

With the ability to extract the form model from form 250, form processor 210 can recognize individual controls that exist within form 250. Further, form processor 210 can determine, on a control-by-control basis, data type information for the control. Using this information, form processor 210 can transform the control into a textual representation that may be included in a message to be distributed by RTCS 225. Processor 210 can identify individual controls within form 250 through inspection of the data model and/or the XForms Model, including constraints and binds, e.g., conditional logic or validation logic such as data type or regular expression(s).

Each of UI control interpretation modules 215 and 220 can be configured to process a particular type of host language. As the host language is tasked with visualization of the controls of the form model, the host language may specify additional constraints for the form model on a control-by-control basis. As an example, a particular control may correspond to a social security number that is to be input by a user into the form. The portion of the host language that corresponds to the control, e.g., the portion that specifies formatting and visualization information for that control, may impose a constraint that a maximum of nine numbers can be received. The host language further may require that such input be provided with the syntax or form "xxx-xx-xxxx". These sorts of constraints can be specified in any of a number of different ways, for example, using regular expressions, or the like within the host language.

In any case, each respective UI control interpretation module 215 and 220 can include the logic necessary to parse a particular host language and, as such, identify any constraints relating to controls of the form model. UI control interpretation module 215, for example, can be dedicated to processing XHTML, whereas UI control interpretation module 220 can be dedicated to processing WML. As an example, UI control interpretation module 215, being dedicated to processing XHTML, can extract any constraints that are associated with a selected control of the form model of form 250 and transform those constraints into a textual representation that can be included within the message that is distributed by RTCS 225. Appreciably, each different UI control interpretation module can perform the same or similar functions in terms of identifying constraints and converting the constraints to textual representations, albeit with regard to the particular host language to which each respective UI control interpretation module is dedicated or suited.

Forms server 245 can, responsive to a request from form agent 205, convert different portions of form 250 or the entirety of form 250, to an image. It should be appreciated, however, that in some embodiments, for example, depending upon the host language used, an interpretation module or an external service can be used to generate the image. The image may be saved in any of a variety of different image file formats, e.g., TIFF (Tagged Image File Format), JPG (Joint Photographic Experts Group), BMP (Bitmap), PDF (Portable Document Format), Scalable Vector Graphics (SVG), another non-raster image format, or the like. For example, forms server 245 can render the entirety of form 250 into an image. In another example, forms server 245 can render a portion of form 250 into an image, e.g., one or more selected controls of form 250 as visualized through interpretation of the host language associated with the selected control(s). The image optionally can be included within a message distributed by RTCS 225.

RTCS 225 can send and receive messages in real-time among any of a plurality of client messaging systems 230-240. In one embodiment, RTCS 225 can be implemented as an instant messaging system, e.g., an instant messaging server, with which client messaging systems 230-240 may register and/or establish a point-of-presence (presence). In another embodiment, the RTCS 225 can be a text-messaging platform or server. Each of client messaging systems 230-240 can be implemented as a data processing system, whether a computer, a mobile device, or the like, executing suitable client-side software, e.g., text messaging software or instant messaging software. The embodiments disclosed within this specification are not intended to be limited to any one particular type of RTCS so long as messages can be processed and distributed in the manner described.

In operation, form 250 can be selected as well as one or more recipients that are to complete form 250. For example, an administrator can determine that form 250 should be filled out and then select one or more recipients, corresponding to client messaging systems 230-240, that are to complete form 250. This information can be provided to form agent 205.

Form processor 210 can retrieve form 250 from a designated location, e.g., as specified within the request from the administrator. As noted, form 250 can include a form model including a plurality of controls, with each control being associated with computer-usable program code in the host language that, when rendered or executed, visualizes the control. Form processor 210 can extract the form model from form 250. For example, form processor 205 can include an Extensible Stylesheet Language Transformation (XSLT) processor (not shown) that transforms form document 250 by extracting the form model contained therein. Form processor 210 can extract the form model and create a new XML-based document that specifies the form model without including the host language.

Example 1, illustrated below, is a fragment of an XForm-based form in which an XForms input for collecting a first name is hosted within the XFDL host language.

```
<field sid="FIRSTNAME1">
    <xforms:input
    ref=
    "instance('INSTANCE')/PersonalData/General/Name/FirstName">
        <xforms:label>First Name</xforms:label>
    </xforms:input>
    <scrollhoriz>wordwrap</scrollhoriz>
    <itemlocation>
        <x>296</x>
        <y>276</y>
        <width>155</width>
    </itemlocation>
    <border>off</border>
    <format>
        <datatype>string</datatype>
        <constraints>
            <mandatory>on</mandatory>
        </constraints>
    </format>
    <next>MIDDLEINITIAL1</next>
</field>
```

EXAMPLE 1

Referring to Example 1 above, form processor 210 can identify a form control from within the form document. For example, from Example 1, form processor 210 can identify and extract the control illustrated in Example 2 below.

```
<xforms:input ref=
"instance('INSTANCE')/PersonalData/General/Name/FirstName">
    <xforms:label>First Name</xforms:label>
</xforms:input>
```

EXAMPLE 2

Form processor 210, having extracted the control illustrated in Example 2, can transform the control into a textual representation such as "First Name". In this example, the textual representation is identified from, or the same as, the "xforms:label" tag. Other textual transforms, however, may be used.

Optionally, form processor 210 can identify the host language as XFDL and invoke the appropriate UI control interpretation module, which can be UI control interpretation module 215 in this example for purposes of illustration. UI control interpretation module 215 can extract any additional constraints that may be associated with the control extracted in Example 2 as specified by the host language. Such constraints also may be transformed or converted into a textual representation.

Form processor 210 can process the textual representation of the control and, if applicable, any textual representation of constraints associated with the control, and generate a real-time message shown as message 260. Form processor 210 can output message 260 to RTCS 225. For example, form processor 210 can include a component (not shown) that establishes a presence with RTCS 225 and may place real-time messages on a bus for transmission via RTCS 225 to one or more of client messaging systems 230-240. That component also can receive real-time message responses, e.g., response message 265, from client messaging systems 230-240 that are sent back through RTCS 225.

Further detail regarding the manner in which forms may be processed and distributed via RTCS 225 will be illustrated with reference to the remaining figures. In general, form agent 205 can process a form and send a textual representation of a control to a recipient. Form agent 205 can send such textual representations as real-time messages one-by-one, for each control, and receive real-time message responses until form 250 is complete, e.g., until form processor 210 determines that form data 255 has been completed according to the extracted form model.

Depending upon the particular configuration of system 200, images of controls can be sent as part of a real-time message to client messaging systems 230-240 to provide a clear indication to the recipient of the information that is desired and the format or syntax in which that information should be provided.

FIG. 3 is a view of a GUI 300 displayed by a client messaging system in accordance with another embodiment of the present invention. GUI 300 illustrates the manner in which the system described with reference to FIGS. 1 and 2 can interact with a client messaging system. A client messaging system can execute real-time communication client software, e.g., instant messaging or texting software, that causes the client messaging system to present or display a GUI, such as GUI 300, to the recipient.

In the example illustrated in FIG. 3, the form agent described with reference to FIGS. 1 and 2 is assigned a screen name of "FormAgent" and has an established presence with the RTCS. Each numbered portion of text within GUI 300 can represent a real-time message (hereafter "message") that has been sent from the form agent or from the client messaging system displaying GUI 300.

As shown, message 305, which has been received from the form agent, is querying a recipient, in this case "Joe Smith," whether or not the recipient accepts a request from "John Doe" to complete a form. The form agent queries Joe Smith for a "Yes" or "No" answer, which may be specified in the form indicated as either "Y" or "N". In response message 310, from the client messaging system, the recipient Joe Smith responds affirmatively with a "Y" input.

Responsive to receiving response message 310, the form agent can continue interrogating Joe Smith via the RTCS, one query or control at a time. Accordingly, message 315 begins with basic instructions how to answer questions to fill out the form. Message 315 ends with the form agent asking the user for a first data item, e.g., the user's first name. The form agent can begin the query with the generic instruction "Enter" and append the textual representation of the first control extracted from the form. In this example, the textual representation can be "First Name".

In response to message 315, the recipient can send response message 320 specifying "Joe." The form agent can receive message 320 and extract the data specified therein. That data, in this case the string "Joe", can be stored within the form data that is being stored in memory for the current form. If any validation is to be performed upon response message 320, the form agent also can perform such validation.

Responsive to determining that response message 320 contained form data that was valid, e.g., in proper form, the form agent can begin processing a next control of the form. The next control, once processed and converted to a textual representation, can be forwarded as part of message 325. Again, the form agent can send the instruction "Enter" with the textual representation of the next control appended thereto, which is "Last Name" in this case. The user can respond with response message 330, providing the last name "Smith."

FIG. 3 illustrates the manner in which a form can be processed by the form agent on a control-by-control basis, with each control resulting in the sending of a message from the form agent via the RTCS to the client messaging system. Response messages received from the client messaging system can be received as messages via the RTCS and processed by the form agent to extract text responses from the received response message.

It should be appreciated that the embodiments disclosed within this specification keep processing on the server side. In the embodiment presented in FIG. 3, for example, the recipient that is completing the form need only use a real-time communication client. The client messaging system does not require any special software to execute or otherwise interpret the form that is being filled out. In addition, the form is "pushed" out to the recipient one control at a time rather than sending an invitation and waiting for a user to visit or otherwise retrieve the form.

FIG. 4 is a view of the GUI 300 displayed by the client messaging system illustrating another embodiment of the present invention. FIG. 4 continues the interrogation of recipient Joe Smith to complete the form as described with reference to FIG. 3. As shown, messages 325 and response message 330 are still visible within GUI 300. Following response message 330, the form agent processes a next control of the form corresponding to a social security number. In this example, the form agent couples the default instructional text "Enter" with the textual representation "Your Social Security Number" of the next control corresponding to a social security number and sends the combined text as message 335.

Message 335 illustrates an embodiment in which a UI control interpretation module has been invoked by the form processor to extract further information which has been included in message 335. In this example, the forms processor has determined the particular host language used for formatting the social security control of the form and invoked the UI control interpretation module for that host language. The UI control interpretation module has determined that the host language has imposed a constraint upon the social security number control requiring that the recipient specify the social security number in one of two possible formats. The UI control interface module has translated that constraint into a textual representation, in this case "xxx-xx-xxxx or xxxxxxxxx". The textual representation of the constraint has been coupled with the default instructional text "must be of the format". Both the default text and the textual representation of the constraint have been coupled with the default text "Enter" and the textual representation of the control and sent as message 335.

In response message 340, Joe Smith provides the response "123-45-6789". As noted, when response message 340 is received by the form agent, and particularly, the form processor, the received form data, in this case the string "123-45-6789", can be validated against expected data. The form data can be validated using any of a variety of different validation techniques. Some of these techniques may involve the data model while others may not.

One validation technique can be to utilize rules associated with the control in the XForms model, which is typically specified in a "bind." This validation technique does not involve the data model. For example, a data type, a regular expression, as well as complex conditional logic can be specified to perform validation. Another validation technique, which does involve the data model, can be to embed an XML schema within the form. Validation can be programmatically or automatically triggered, e.g., responsive to some detected action or input from the user such as a submit or send action from the user when the user attempts to move to a next portion of the form. Yet another validation technique can include calling an external system or service, such as a rules engine, to perform the validation.

The validation techniques described above are provided for purposes of illustration only and, as such, are not intended to limit the embodiments described within this specification. One or more other validation techniques can be used that may or may not involve the data model. In this regard, any implied ordering of steps for validation are described to better illustrate the examples provided and are not intended to imply only one specific ordering of such steps.

When validated, the form processor can store the form data within the form data for the form. In another embodiment, form data can be inserted into the form and an application programming interface (API) to the processor can be used for validation. When the form data, or data item is not valid, e.g., fails validation, the form agent can respond with follow-up information. For example, any help text that is specified as part of the form can be sent as a follow-up message. A default explanation can be coupled with the help text such as "The entry you provided was not in the proper format. Please re-enter the information." After the default text, any help text can be appended and included in the follow-up message. It should be appreciated that such help text can be extracted from the control and/or from the host language corresponding to the control using an appropriate UI control interpretation module.

FIG. 5 is a view of a GUI 500 displayed by a client messaging system in accordance with another embodiment of the present invention. GUI 500 illustrates an embodiment of the present invention in which an image of the form, or a portion of the form, is generated by the form server and sent to the client messaging system via the RTCS. As shown, an image 505 of the form being completed by the recipient has been generated and sent as, or within, a message, or as part of another message to the client messaging system. Once received, the client messaging system can display image 505. In addition to sending image 505, the form agent can send a further message, or messages, as the case may be, which are illustrated as messages 510, 515, and 520. Message 510 can acknowledge the user's prior agreement to complete the form. Message 515 can explain the purpose of image 505. Message 520 can be specify the first textual representation of a control of the form being filled out. As can be seen in image 505, the first name of the user is the first control in the form. It should be appreciated that, depending upon the messaging format of the RTCS, messages 510, 515, 520, and/or image 505, may represent a single, larger message, or a plurality of individual messages as shown.

FIG. 6 is a view of a GUI 600 displayed by a client messaging system in accordance with another embodiment of the present invention. GUI 600 illustrates an embodiment of the present invention in which an image of a portion of a form corresponding to at least one control of the form is generated by the form server and sent from the form agent to the message client via the RTCS. The form agent can send message 605, which can acknowledge the user's prior agreement to complete the form, followed by an image 610.

Image 610, which visualizes a portion the form being completed by the recipient, has been generated and sent as a message, or as part of another message to the client messaging system. In the example illustrated in FIG. 6, a plurality of controls are included, or rendered, in image 610. In particular, the controls corresponding to first name, middle initial, and last name have been included. In one embodiment, however, the image can include a visualization of only a single control.

Image 610 can be generated in a variety of different ways. For example, in one aspect, a control of interest, e.g., the control being processed, can be selected. Any other controls to be displayed within a predetermined area surrounding the control of interest, as specified by the host language, can be included in the image. In another aspect, the entire form can be rendered as an image and then cropped as may be desired to represent the particular control of interest.

The form agent can send a further message, or messages, as the case may be, which are illustrated as messages 615 and 620. Message 615 can explain the purpose of image 605. Message 620 can be specify the first textual representation of a control of the form being filled out. As can be seen in image 610, the first name of the user is the first control in the form.

FIGS. 3-6 illustrate various aspects of how forms, or portions thereof, can be pushed to clients. Another aspect of the embodiments described within this specification can include the persistence of partially completed as well as completed form documents. Persistence can be handled in any of a variety of different ways. In one embodiment, persistence can be implemented using a document-centric persistence technique. In such an embodiment, the form document can include any information, including the state of the data model or data models contained therein. Accordingly, the form document can be persisted, e.g., stored, in its entirety and reloaded as may be required or needed throughout the process of filling in and/or approving the form document.

For example, consider the case where a user is filling in a form via IM or another RTCS as described. If, and when, the user exits the IM session without completing the form, the form can be automatically, e.g., responsively, stored and persisted. At a later time, for example, when the user once again establishes a presence with the RTCS, the user can be asked by the form agent via IM whether he or she would like to continue filling in the remaining data for the form. The form can be reloaded and the process can continue from where the process was previously stopped or paused.

In another embodiment, persistence can be implemented using a data-centric persistence technique. With a data-centric persistence technique, data can be stored independently, e.g., separately, from the form template. For example, a technology such as HTML or Java Server Pages (JSP) forms can be used and the template can be implemented using any of a variety of different technologies. Data can be stored, for example, using a template identifier as one of the fields or keys. Additional metadata also can be stored such as the filling in process status or state. When the data is loaded, the corresponding template can be loaded and the data inserted and/or merged into the template. The form then can be presented to the user, e.g., using the RTCS process described herein. While described with reference to HTML and/or JSP technologies, a data-centric technique for persistence also can be used with XForms-based forms.

The examples described above are provided for purposes of illustration only and are not intended as limitations of the embodiments disclosed within this specification. Any of a variety of mechanisms for preserving state of an incomplete form can be used so that one may resume working upon the form at a time in the future.

Figure 7A:
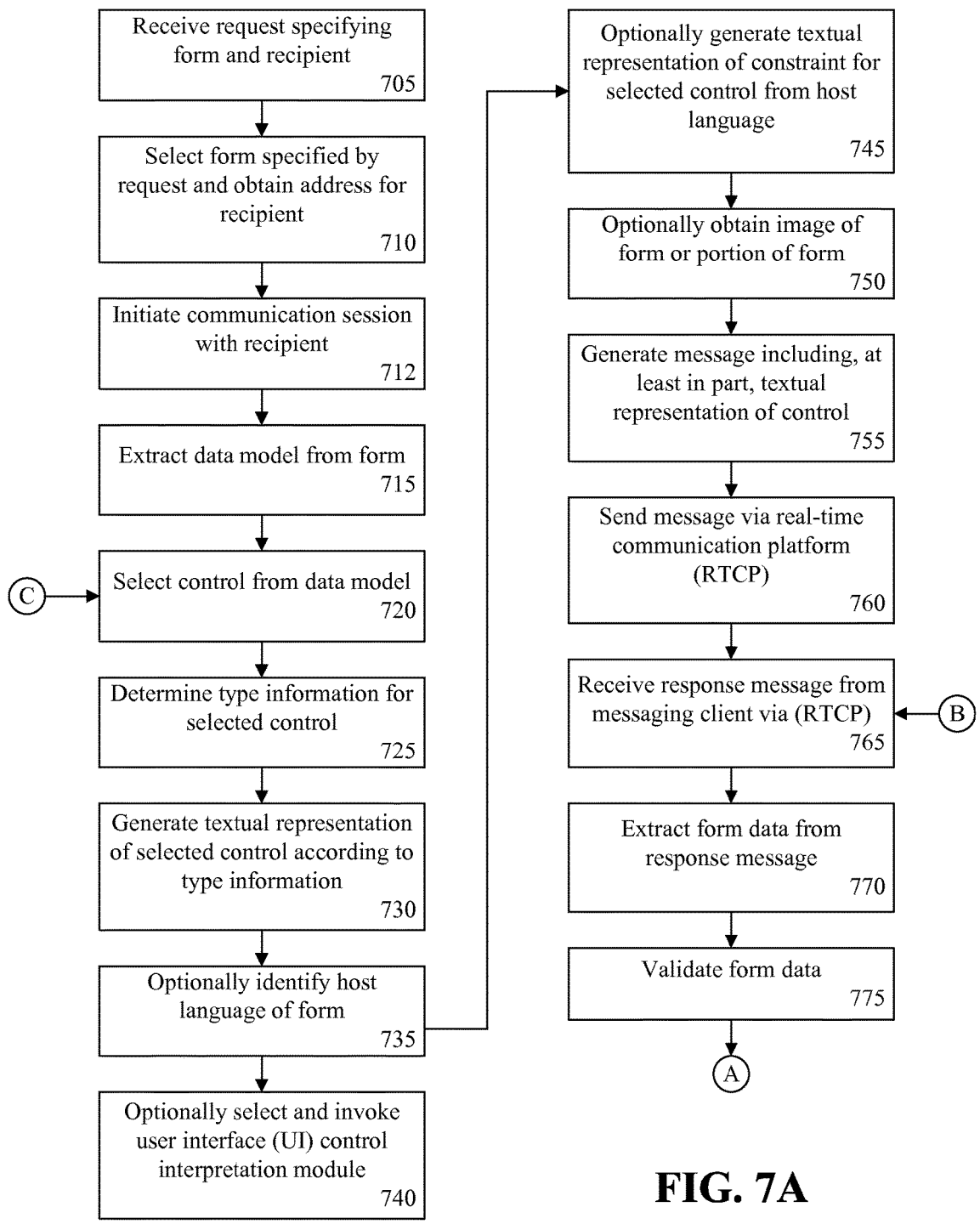
FIGS. 7A and 7B, taken collectively, form a flow chart illustrating an automated method of interrogative population of forms using a real-time communication system in accordance with another embodiment of the present invention.
Figure 7B:
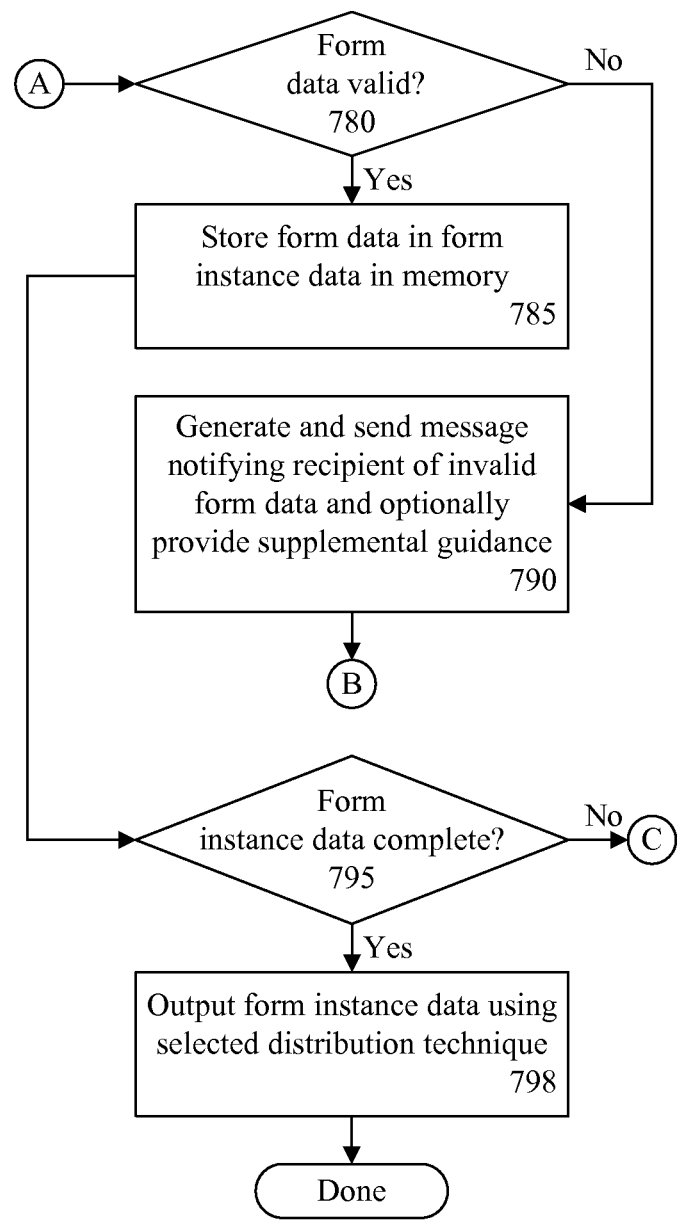

FIGS. 7A and 7B, taken collectively, form a flow chart illustrating an automated method 700 of interrogative population of forms using an RTCS in accordance with another embodiment of the present invention. Method 700 can be implemented using a system as described with reference to FIGS. 1-6. Accordingly, method 700 can begin in step 705, where the form agent can receive a request from a user, e.g., an administrator. The request can specify a particular form to be populated as well as one or more recipients that are to complete the form. For purposes of illustration, method 700 will be described using a single recipient. It should be appreciated, however, that the form agent may carry on communication sessions with a plurality of different recipients, concurrently, each working to fill out a same or a different form with the form agent.

In step 710, the form agent can select the form as specified in the request and obtain an address for the recipient. For example, the form agent can retrieve the form from a designated network location specified in the request and load the form for processing. The form agent further can obtain an address to which messages can be sent for the recipient. The address may be obtained from an online directory or can be provided by the administrator within the request. For example, the address can be an IM username or, in the case of a mobile device, a mobile telephone number, etc. The form agent, being registered with the RTCS, can take further steps such as verifying whether recipient is currently available, e.g., has established presence with, or is logged into, the RTCS.

In step 712, the form agent can establish a communication session with the recipient via the RTCS. For example, the form agent can sent a message asking whether the recipient is willing to complete a form as illustrate with respect to the GUIs described herein. Responsive to receiving an incoming message, the client messaging system of the recipient can open, or ask to open, an instant messaging session with the form agent. In the case of text messaging, messages and response messages can be exchanged without establishing a formal real-time communication session. In any case, the example illustrated in FIG. 7 presumes that the recipient has agreed to continue. If, however, the recipient does not agree to complete the form, the method can end.

In step 715, the form agent can extract the data model from the form. Extracting the data model effectively strips away the host language resulting in another electronic document typically specified in a markup language such as XML. It should be appreciated that forms can, in some cases, contain more than one data model. Extraction can be applied to one or more or all data models in the form. For example, one or more selected or particular data models can be extracted from the form. Further, specific data instances within a particular data model can be extracted from the form. In some cases, for example, a data instance may correspond to a specific stage in a business process.

In step 720, the form agent can select a control from the data model. The form agent, for example, can select controls in the order in which the controls are specified within the data model, e.g., sequentially. In step 725, the form agent can determine type information of the selected control. As noted, the type information of a control can indicate the particular data type of the control, whether the control is an input or an output, and any other information that may characterize the selected control within the data model.

In step 730, the form agent can generate a textual representation of the control according to the type information. For example, the form agent can include one or more different text transformation processes or techniques that can be selected and invoked to generate the textual representation of the selected control based upon the type information. For example, the type information can indicate a binary type of input that can correlate to a "Y" or "N" type of expected response, a string, or a list of allowable strings that may be presented in the textual representation separated by delimiters.

Steps 735, 740, and 745 represent optional steps that can be performed, for example, in an embodiment where one or more UI control interpretation modules are included in the form agent. Accordingly, in step 735, the form agent optionally can identify or determine the host language used for the selected form. In step 740, the form agent optionally can select and invoke a particular UI control interpretation module from the plurality of such modules provided. In step 745, a textual representation of any constraints that apply to the selected control optionally can be generated, as specified within, or interpreted from, the host language via the UI control interpretation module.

Step 750 represents an optional step in which the form agent interacts with a forms server to obtain an image of the form or a portion of the form. For example, the form agent can sent a request to the form server for an image of the form, or a portion of the form. The form server can generate the image of the form, or a portion of the form, as the form would appear rendered, or displayed upon, a display of a client messaging system, e.g., within a browser in which the form has been loaded. The forms server can output the image to the form agent.

In step 755, the form agent can generate a message that includes, at least in part, the textual representation of the control. The message, as noted, is a message that is compatible with the RTCS. Further information, if generated or available such as the textual representation of any constraints relating to the selected control and/or the image also can be included in the message or included in one or more additional messages that can be sent to the client messaging system via the RTCS.

In step 760, the form agent can output the message to the RTCS. The message will be "addressed" to the recipient. Accordingly, the RTCS can distribute or send the message to the appropriate recipient. Through his or her client messaging system, and within a real-time communication session with the form agent, each recipient can view the received message including the textual representation of the control, the textual representation of the constraints, if sent, and the image, if sent. The recipient can enter a response within his or her client messaging system that can be sent to the form agent via the RTCS.

In step 765, the form agent can receive the response message from the recipient via the RTCS. In step 770, the form agent can extract form data from the response message. That is, the form agent can extract the particular data item specified by the recipient, thereby removing any message formatting needed by the RTCS, in answer to the message sent for the selected control. In step 775, the form agent can validate the extracted form data. The extracted form data can be compared with any validation rules that may be specified in the selected form that correspond to the selected control.

Continuing through jump circle A to step 780 of FIG. 7B, the form agent can determine whether the form data is valid. If so, the method can proceed to step 785, where the form agent can store the extracted form data within a data storage device or other memory, e.g., a database. If the form data is not valid, the method can proceed to step 790, where a message notifying the recipient of the invalid form data can be generated and sent via the RTCS. The generated message can include text that indicates that the form data provided by the recipient was not valid, or in the proper syntax. The message optionally can include supplemental guidance that may be extracted from the form, e.g., the control itself, or the host language that corresponds to the selected control. For example, help text can be identified from the host language, extracted, and included in the message as supplemental guidance information. The supplemental guidance information can be obtained using any of the various techniques described within this specification. It should be appreciated that the message can include a textual representation of any information that would be provided to the recipient were that recipient to be executing the form locally within his or her own browser.

After step 790, the method can loop back to step 765 to receive the response message from the recipient and continue processing the response message. It should be appreciated that method 700 can include additional error checking steps and other logic, as may be required, to handle error conditions. For example, method 700 can include logic to terminate after a particular period of time in which no response message is received from the recipient. In another example, method 700 can include logic to terminate after receiving a predetermined number of response messages specifying form data that is invalid.

Continuing with step 785, where the form data extracted from the response message is valid, the form agent can store the form data within a data storage device or other memory. The form instance data can include each data item, or portion of form data, specified by the recipient in the current real-time communication session in answer to a message specifying a control.

In step 795, the form agent can determine whether the form data is complete. More particularly, the form agent can determine whether a portion of form data, e.g., a data item, that is valid, has been received and stored within the data storage device for each control of the data model of the form. If so, the method can continue to step 798. If not, the method can loop back to step 720 to select a next control from the data model for processing as described herein. Accordingly, method 700 can continue where the form agent pushes a query, in the form of a message, to the recipient for each control of the data model.

In step 798, when the form data is complete, the form agent can output the form data using a selected processing or distribution technique. The form data, for instance, can be provided to another system. For example, the form data can be provided to a workflow system, which will initiate a new business process within the workflow system. In another example, the form data can be processed and stored within a database, populated into one or more tables, added to a document repository, or the like.

Another example can include transforming the form data into a flow-based electronic form, e.g., an XHTML or an XFDL electronic form, based upon the form model. Still another example can include applying a "form template merge" service that merges the form model with a host language template that has been designed to host the specific form model.

Method 700 has been described as occurring during a single communication session. In another embodiment, state of the form can be preserved thereby allowing a recipient to terminate the real-time communication session. Any form data received by the form agent during the real-time communication session can be preserved or persisted as described within this specification. Subsequently, the form agent can initiate a different real-time communication session with the recipient, at which time the recipient may complete the form.

Further, while the method 700 has been described with reference to a single user, it should be appreciated that a given form may be filled in by a plurality of users. In that case, an RTCS session can be initiated with a first user. One or more portions of the form can be completed through the RTCS as described. The form data can be persisted. Subsequently, an RTCS session can be initiated with a second and different user. During that RTCS session with the second user, the remaining form data to complete the form can be obtained. The form can include, or be associated with, logic that allows the form agent to determine when the first user has completed all necessary data items for the form, identify the second user, automatically start an RTCS session with the second user, and collect the remaining data for completion of the form. The process can be implemented where more than two persons are required to complete a form.

As another example, one field of the form being filled out may be an approval field that must be completed by a supervisor or other user with adequate or predetermined credentials. In that case, one of the RTCS sessions that is initiated to fill in data for the form can be with that individual. The RTCS session can be initiated as the first RTCS session to obtain permission, as the last RTCS session to provide the individual with the opportunity to review one or more portions or all of the data collected for the form from one or more other users, or at any time during the process of completing the form as may be deemed appropriate.

In any case, the supervisory user can provide a binary type of response, e.g., yes, no, approve, deny, etc. This allows the embodiments described within this specification to capture "intent" from one or more users. This can be particularly beneficial when the form being completed constitutes a contract between the various users that are involved in completing the form. When the form is a contract, for example, each user that is a party to the contract can provide an "accept" or "reject" type of response that can bind that party to the contract as specified by the form.

The embodiments described within this specification provide methods, systems, and apparatus for obtaining form data. In accordance with the inventive arrangements, forms can be "pushed" to recipients control-by-control, using a RTCS. The messages exchanged can be formatted in the native format used by the RTCS, which alleviates the need for specialized hardware and/or software within the client messaging systems of those that are completing the form. The form can be completed through a continued real-time communication session, e.g., an instant messaging or text messaging session, in which messages from the form agent ask for items of information specified by the form and response messages from the recipient supply answers.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of obtaining form data from an electronic form, comprising:
   extracting a XForm model, specifying a flow-based layout of the form, from the form;
   transforming a control, within the XForm model, into a textual representation of the control;
   identifying a constraint of the control;
   generating a textual representation of the constraint;
   sending, using an instant messaging system and within a message, the textual representation of the control and the textual representation of the constraint to a client messaging system;
   receiving, using the instant messaging system, a response message including form data from the client messaging system;
   validating, with regard to the control, the received form data; and
   storing, upon the received form data being validated, the received form data.

2. The method of claim 1, further comprising:
   sending, using the instant messaging system, a further message to the client messaging system upon determining that previously-received form data is invalid.

3. The method of claim 1, further comprising:
   generating, responsive to determining that form data for the entire form is not complete, a textual representation of a next control within the XForm model; and
   sending, using the instant messaging system and within a subsequent message, the textual representation of the next control.

4. The method of claim 1, further comprising:
   establishing, using the instant message system, a real-time communication session with the client messaging system.

5. The method of claim 1, further comprising:
   generating an image of at least a portion of the electronic form; and
   sending, using the instant messaging system, the image to the client messaging system.

6. The method of claim 1, further comprising:
   identifying a host language of the electronic form that visually renders the control; and
   selecting, based upon the host language, a user interface control interpretation module for processing the control from a plurality of user interface control interpretation modules.

7. A computer hardware system configured to obtain form data from an electronic form, comprising:
   at least one hardware processor, wherein the at least one hardware processor is configured to perform and/or initiate:
      extracting a XForm model, specifying a flow-based layout of the form, from the form;
      transforming a control, within the XForm model, into a textual representation of the control;
      identifying a constraint of the control;
      generating a textual representation of the constraint;
      sending, using an instant messaging system and within a message, the textual representation of the control and the textual representation of the constraint to a client messaging system;
      receiving, using the instant messaging system, a response message including form data from the client messaging system;
      validating, with regard to the control, the received form data; and
      storing, upon the received form data being validated, the received form data.

8. The system of claim 7, wherein the at least one hardware processor is further configured to perform and/or initiate:

sending using the instant messaging system, a further message to the client messaging system upon determining that previously-received form data is invalid.

9. The system of claim 7, wherein the at least one hardware processor is further configured to perform and/or initiate:
generating, responsive to determining that form data for the entire form is not complete, a textual representation of a next control within the XForm model; and
sending, using the instant messaging system and within a subsequent message, the textual representation of the next control.

10. The system of claim 7, wherein the at least one hardware processor is further configured to perform and/or initiate:
establishing, using the instant message system, a real-time communication session with the client messaging system.

11. The system of claim 7, wherein the at least one hardware processor is further configured to perform and/or initiate:
generating an image of at least a portion of the electronic form; and
sending, using the instant messaging system, the image to the client messaging system.

12. The system of claim 7, wherein the at least one hardware processor is further configured to perform and/or initiate:
identifying a host language of the electronic form that visually renders the control; and
selecting, based upon the host language, a user interface control interpretation module for processing the control from a plurality of user interface control interpretation modules.

13. A computer program product, comprising
a computer-usable storage device having stored therein computer-usable program code,
the computer-usable program code, which when executed by a computer hardware system, causes the computer hardware system to perform:
extracting a XForm model, specifying a flow-based layout of the form, from the form;
transforming a control, within the XForm model, into a textual representation of the control;
identifying a constraint of the control;
generating a textual representation of the constraint;
sending, using an instant messaging system and within a message, the textual representation of the control and the textual representation of the constraint to a client messaging system;
receiving, using the instant messaging system, a response message including form data from the client messaging system;
validating, with regard to the control, the received form data; and
storing, upon the received form data being validated, the received form data.

14. The computer program product of claim 13, wherein the computer-usable program code further causes the computer hardware system to perform:
sending using the instant messaging system, a further message to the client messaging system upon determining that previously-received form data is invalid.

15. The computer program product of claim 13, wherein the computer-usable program code further causes the computer hardware system to perform:
generating, responsive to determining that form data for the entire form is not complete, a textual representation of a next control within the XForm model; and
sending, using the instant messaging system and within a subsequent message, the textual representation of the next control.

16. The computer program product of claim 13, wherein the computer-usable program code further causes the computer hardware system to perform:
establishing, using the instant message system, a real-time communication session with the client messaging system.

17. The computer program product of claim 13, wherein the computer-usable program code further causes the computer hardware system to perform:
identifying a host language of the electronic form that visually renders the control; and
selecting, based upon the host language, a user interface control interpretation module for processing the control from a plurality of user interface control interpretation modules.

* * * * *